Figure 1:
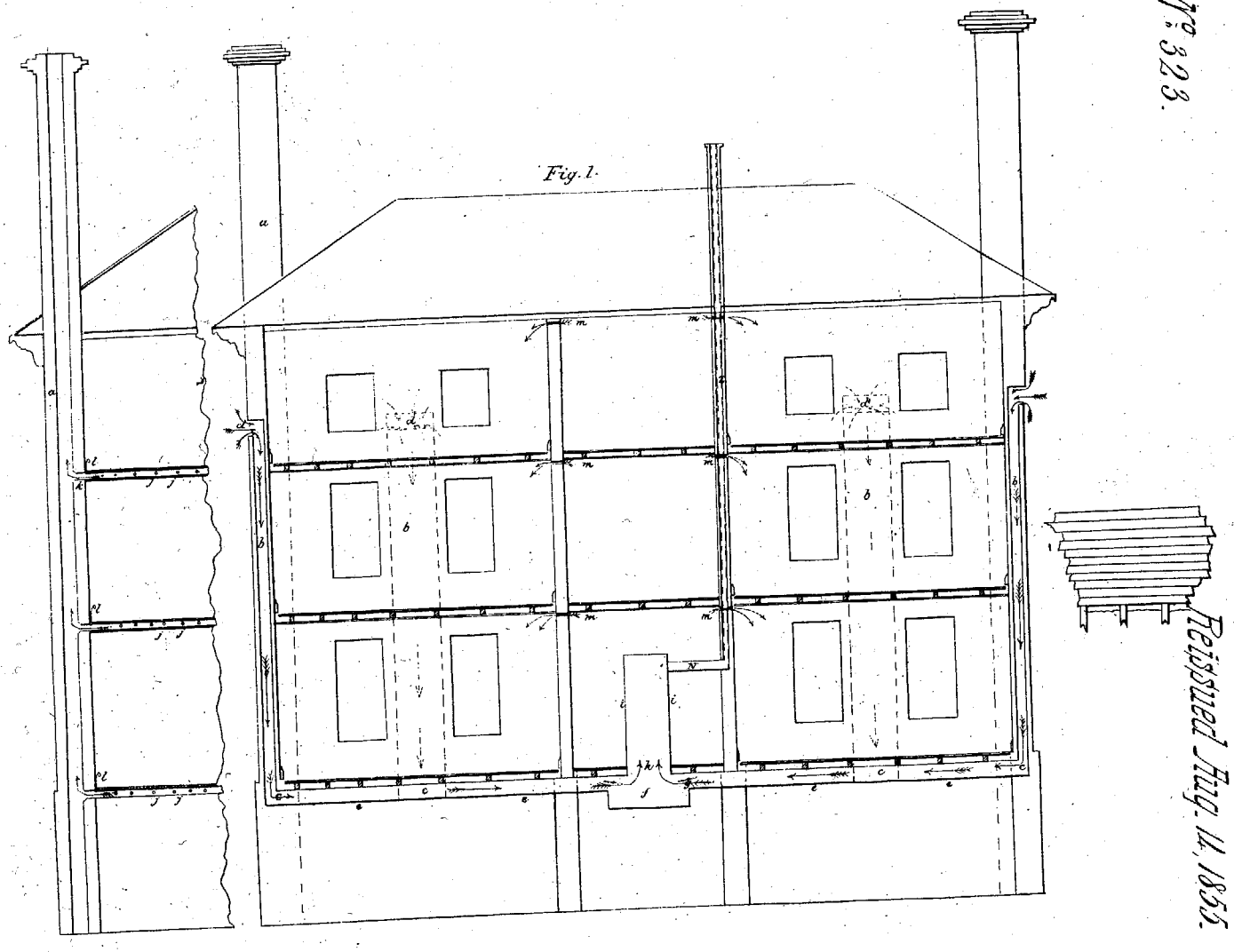

Sheet 1 - 1 Sheets.

H. Ruttan,

House Ventilator,

No. 323.

Reissued Aug. 14, 1855.

Sheet 2-4 Sheets.

H. Ruttan,

House Ventilator,

No. 323.

Reissued Aug. 14, 1855.

Sheet 3 - 4 Sheets.

H. Ruttan,

House Ventilator,

No. 323. Reissued Aug. 14, 1855.

Sheet 4 - 4 Sheets

H. Rutten,

House Ventilator,

No 323.

Reissued Aug. 14, 1855.

UNITED STATES PATENT OFFICE.

HENRY RUTTAN, OF COBOURG, CANADA WEST.

METHOD OF WARMING AND VENTILATING BUILDINGS.

Specification forming part of Letters Patent No. 5,958, dated December 5, 1848; antedated June 23, 1848; Reissue No. 323, dated August 14, 1855.

*To all whom it may concern:*

Be it known that I, HENRY RUTTAN, of Cobourg, in the county of Northumberland, formerly part of the Newcastle district, in the Province of Canada West, have invented certain improvements in the ventilation and warming of buildings, railroad-cars and other carriages, steamboats and other vessels, and the apparatus by which the ventilating air may be warmed in cold weather; and I do hereby declare that the following is a full, clear, and exact description of the same, reference being had to the accompanying drawings, forming part of this specification, in which—

Plate 1 illustrates the application of my invention to the ventilation of buildings. Plate 2 represents the apparatus for warming the air in cold weather. Plates 3 and 4 illustrate the application of my invention to railroad-cars.

I will first proceed to describe the application of my invention to house-ventilation. I take, for instance, the building represented in Plate 1, which is a dwelling-house three stories high above the basement, with a hall through the middle from bottom to top, and will describe its construction. The walls may be of wood, brick, stone, or other material—say, brick, for example—and may be made hollow throughout, terminating in flues to be carried out similar to common chimneys, for the escape of the vitiated air; but if for any reason hollow walls be objected to, then I construct for the above purpose as many foul-air flues, *a a a*, (see the vertical sections, Fig. 1,) as may in their production upward embrace most if not all of the rooms within the building, said flues being severally of such size that their aggregate area is sufficient to carry off the vitiated air. These flues should be enlarged at every succeeding story upward. The tops should be carried up to as great a height as practicable. I also construct one or more flues, *b b b b*, (see Fig. 1,) which, as they are for the introduction of pure air, I call "shafts." These are to open into the basement *c c c c*, immediately under the joists. There should, for efficiency, be one of these in each of two opposite sides of the building, or if one in each of the four sides all the better. These shafts should be carried up into the walls and opened at *d d d d* to a height above that of the floating miasm of impure localities and below that of the influence of the smoke of adjacent chimneys. At the lower end of the pure-air shafts *b b b b* and closely under the joists of the lower story, they must communicate or unite with ducts *e e e e*, (which may be made of boards,) and carried to a common point directly under where it is intended that the ventilator or warming apparatus is to stand—say, in the center of the hall on the first floor, and there inclosed in a box, *f*. The mouths of these ducts, if there be any coming from opposite directions, should have hanging doors or shutters *g g*, (see Fig. 1,) made of the lightest material, and so adjusted that any violent movement of the external atmosphere down one shaft should shut up the opposite one, and vice versa. Above the box *f*, I open the floor into the hall *h*. (See Fig. 1.) Then I put a casing, *i i*, of some tight and bright metal—say, tin-plate—around the whole aperture, to stand about eight feet high. Within this casing I place the ventilator hereinafter to be more particularly described, so that the whole of the ventilator except the front containing the door is hidden from view. Upon the top of this casing are doors or other conveniences, through which the air passes into the hall, and by the shutting or opening of which the temperature of the air passing up when there is fire in the ventilator may be regulated without waiting the tedious process of altering the power of the fire. N is the smoke pipe of the ventilator.

I have thus far shown how the pure air is brought into the building. I will now proceed to describe the internal arrangements for the purpose of introducing the pure air to the several apartments at the top and carrying off the vitiated air at the bottom. The vitiated air, after leaving the apartments, circulates in its way to the foul-air flues *a a* through the foul-air chamber between the floor of the story it leaves and the ceiling of the one next below it, or, in other words, the foul air descends from the apartments into a foul-air chamber, to be thence exhausted by the foul-air shaft or shafts. This circulation is provided for by perforating the studs and joists, as indicated at *g g g* in Fig. 1, or by other suitable passages. The number or size of these passages must of course be increased as the place of exit of the vitiated air is approached. When the floor is laid, it is kept separate from the wall, as shown at *a a* in Fig. 2, sufficiently to allow the same or a greater volume of air to escape between the flooring and the wall than is allowed to come into the room; or, if the apartments are to be carpeted, the surbase or skirting should be reduced or cut away at the under side, as shown at *o o*, in Fig. 4, to allow the same quantity of air to escape. Some part of every apartment may be made in almost all cases to come next to or comprehend one or other of the main foul-air flues *a a a;* if not, small diagonal flues should be run from the room into the main flues; so also there may be small communications opened from the end of every hollow partition (if such be used in the building) with the main or some branch flue. The openings *k k k* (see Fig. 1) from each story into the foul-air flues are to be made on a level with the joists, and each of these openings may be closed or opened at pleasure by a small slide or gate, *l l l*. The pure air enters the apartments through apertures *m m*. (See Fig. 1.) These apertures should be as high up as the ceilings or cornices will admit. A narrow opening the whole length of the partition which separates the apartment from the hall is best, with here and there a pillar left, of course, to support the superstructure, the cornice, when one is made, covering the whole from sight. When the arrangements for ventilation are complete, one or other of the pure-air shafts *b b b* will always be receiving the external atmosphere. The admission of the air will be facilitated by a swinging door or cap fitted to the mouth of each shaft, as shown in the vertical section Fig. 3 and the horizontal section Fig. 4. This door or cap, swinging to either side according to the direction of the wind, will deflect currents of air and conduct them into the shaft when the wind is not blowing directly into the mouth. The admission of air will be accelerated when a fire is used in the ventilator. And again, the foul or vitiated-air flues being carried out to a height much beyond the mouths of the pure-air shafts, act as exhausters by their draft, and the moment the foul-air slides *l l l* within the rooms are opened they will begin to fill with pure air. Any one of the rooms in the building may thus be ventilated independently of the others, or the whole together. The whole building is constantly filled, and the initiative in this system of warming and ventilating is in letting the cold and vitiated air out. Upon this principle a room or building perfectly air-tight, excepting the openings made for this purpose, is thoroughly ventilated, which it cannot be upon any other principle. The passage for the escape of the vitiated air being below the floor, the tendency of the draft must be downward, and the miasm and carbonic-acid gas always filling the space below the floor of every inhabited apartment is thus kept below, instead of being drawn upward, as it would be with the draft anywhere above the floor. The sum of the areas of the sections of the vitiated-air flues *a a a a* should somewhat exceed the sum of those of the pure-air shafts *b b b b*.

In applying this system of ventilation to buildings already erected the same general arrangements as above described should, as far as circumstances will admit, be observed. It may be difficult in this case to perforate the joists and studs, and if on account of the use of carpets the floor cannot be perforated, a flue may be made around the room by removing the surbase a sufficient distance from the wall. The pure-air shaft may be constructed of wood, and placed either directly against or at a distance from the building. It may also be inconvenient in a building already erected to open the wall to admit the pure air from the hall the whole length of the apartments. In such case a single aperture will do.

Figure 2:
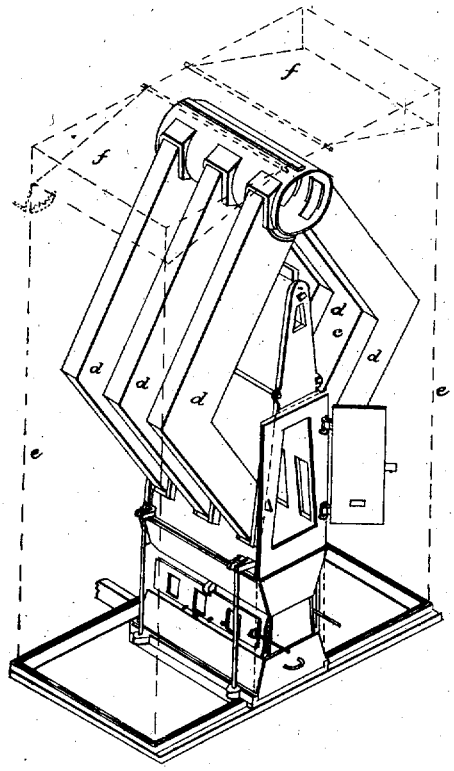
Figure 7:
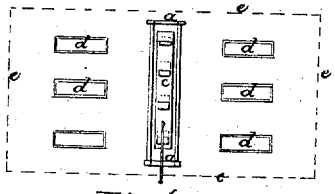

I will now proceed to describe the apparatus represented in Plate 2, by which the air is warmed in winter, which I term the "winter ventilator." In the construction of this apparatus I have aimed to favor as much as possible the rapid ascent of the air in the midst of which it stands, so as to prevent the absorption of the oxygen and the oxidation of the iron of which it is composed. The fire-chamber is situated within or between the radiating-pipes *d d*, which diverge from it for a certain distance, and again converge to connect with a top flue, the radiating-pipes thus having an oblique direction to prevent the stagnant and dead body of air which always more or less collects over the tops of flat or round heaters. The combustion air is taken from the pure air only, and is therefore more efficacious than when taken, as in the ordinary way, from a cellar or room. This air is admitted from the bottom at *b b*, and also from the top at *c*, that admitted from the top being supplied from an elevated chamber, *a*, which is provided for the purpose of warming it. The upper combustion air is let down from the chamber *a* by a register, *c*, (see Figs. 2, 3, and 7,) in small jets, so that it is ready for combustion when it meets the unconsumed gases of the fuel. The radiating flues *d d d* divide equally all the heat of the flue, and carry it in currents coexistent with, parallel to, and between directly ascending currents of air, thus dispersing all the heat equally through the body of air. The iron heater or ventilator thus described is placed directly over the opening before described in the floor of the hall, as represented in Fig. 2, where the tin casing is shown in red outline.

As one of the great characteristics of my system of ventilation is the filling the building with the ventilating-air, the ventilator or air-warmer may for winter ventilation as well stand in the highest story as in any of the lower ones, the work being as efficiently performed in one place as the other.

Figure 6:
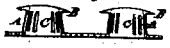
Figure 5:
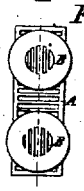
Figure 1:
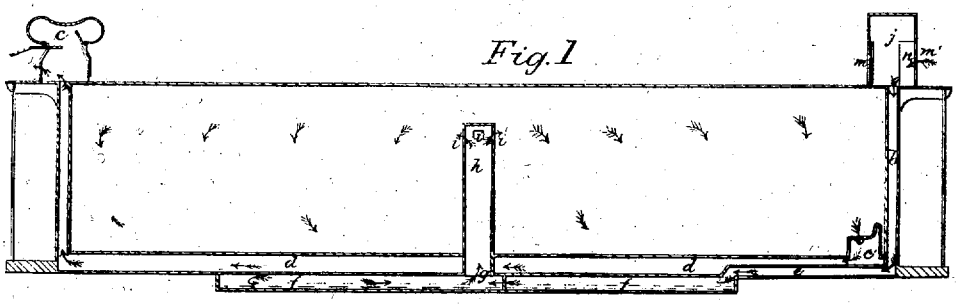
Figure 2:
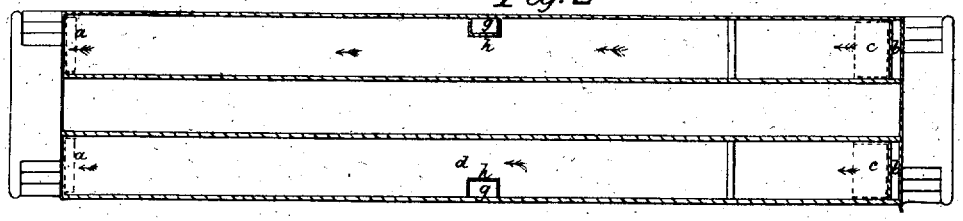

The fire-grate of the ventilator or air-warming machine shown in Figs. 5 and 6 of Plate 2 is composed of one or more cylindrical grates raised above the ordinary flat-grate floor. It is constructed with a view to the threefold advantage, first, of distributing or dispersing and mixing the incoming combustion air; second, of covering a great portion of the apertures which admit this air from being choked up by the fuel; and, third, of contributing largely, by the hollows underneath formed by the raised portions of the grate, to the raising of the temperature of the fuel. These objects are effected, first, by the cross-currents of air from the flat and perpendicular apertures A meeting; second, by the cap or covering B; third, by the hollow C underneath, as above stated.

A railroad-car or other carriage may be ventilated in the same way as a building, or with little variation. I have shown, in Plates 3 and 4, two methods of applying my system to railroad cars. That shown in Plate 4 will be first described. An inlet opening or openings, *a*, is made in the bottom, top, sides, or ends of the car, of sufficient size to keep up a constant supply of pure air within. Let this air be brought in a duct or ducts directly under the ventilator or air-warmer when intended for winter ventilation. This ventilator, which may be substantially like that hereinbefore described, may be placed in such part of the car as may be most convenient. It is surrounded by a tin casing, *b*, in size sufficient to inclose both it and the quantity of air admitted. This casing *b* is to reach from the floor to the roof of the car and to be secured both at bottom and top. The smoke-pipe C may be carried within it up to and out at the top. At *d*, as close as possible to the top, the casing *b* should have an opening or openings sufficient to let out as much air as is admitted at the bottom. This aperture may be furnished with a slide to vary it and regulate the temperature when required. The flooring of the car is perforated, as indicated at *e e*. The perforations should be so distributed and of such capacity as to cause the air to pervade the whole car in making its escape through the bottom. If the quantity of air should require to be increased, lips of tin or other material may easily be so constructed on the outside and near the inlet opening or openings through which the air is admitted as that by the motion of the car the incoming pure air may be increased in quantity. These lips might, however, be dispensed with, and the same result obtained by making the inlet or inlets through which the air is admitted open in the direction in which the car runs. The egress of the foul air may be assisted by sheltering in the direction in which the car runs the holes *e e*, or other outlets for the foul air.

For either summer or winter ventilation, coarse canvas, gauze, buckram, fine sieve-wire, or any other fabric which will distribute the air may be placed, as shown at *f*, in Fig. 1, of Plate 4, about two or three inches below the transverse beams which now generally support the roofs of cars. Strips of wooden lath of that thickness may be placed at intervals longitudinally of the car, to which the fabric used may be fastened. The fresh air should be conducted into this interval between the fabric and the roof, as shown by the arrows in Fig. 1, and the effect will be the same as in the other case. Small sliding covers for the perforations in the bottom of the car may be constructed so that any passenger could shut or open those under his own seat, and thus regulate the ventilation of his locality.

Plate 3 exhibits another arrangement for car-ventilation which resembles in a greater degree than those just described my previously-described arrangements for house-ventilation, and also has the principles of increasing the quantity of the incoming pure air by the motion of the car and of facilitating the egress of the foul air by sheltering the escape-orifices from the current of air caused by the movement, more fully carried out. Fig. 1 is a longitudinal section of the car, and Fig. 2 a horizontal section of the same below the floor. *a a* are foul-air shafts placed at one end of the car, one on each side of the door, commencing under the floor and extending through the roof, connecting under the floor with flues *d d*, which extend under the floor the whole length of the car, and are of a width equal to the space usually occupied by the seats. At the opposite end of the car to the foul-air shafts *a a* openings *c c* are cut through the floor, or otherwise made into the flues *d d*, to allow the foul air from the car to escape into the said shafts. At the last named end of the car the pure-air shafts *b b* are arranged like the foul-air shafts at the opposite end terminating at the bottom in ducts *e e*, which convey the air over the surface of water contained in a close tank, *f*, to moisten it and deprive it of dust before allowing it to pass through the opening *g*, which conducts it to the ventilator, which is placed over the said opening *g*, and surrounded by a casing, *h*, as in all my other ventilating arrangements. The pure air is admitted to the car through openings *i i* in the top of the ventilator-casing *h*, and is distributed through the car, constantly descending in a body. The vitiated air escapes through the openings *c c*, passes along the flues *d d*, under the passengers' feet, and from thence enters the upright shafts *a a*, and finally makes its escape through the roof. In winter time when a fire is used in the ventilator the foul air escaping along the flues *d d* will be at a much higher temperature than the external atmosphere, and will warm the passengers' feet.

Figure 4:
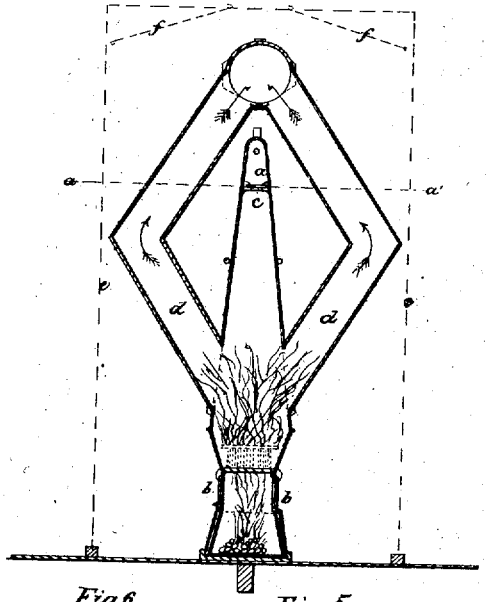
Figure 3:
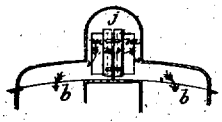
Figure 4:
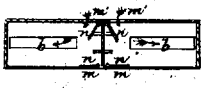
Figure 1:
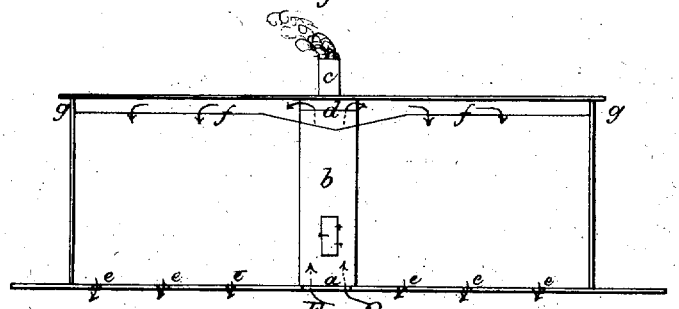
Figure 2:
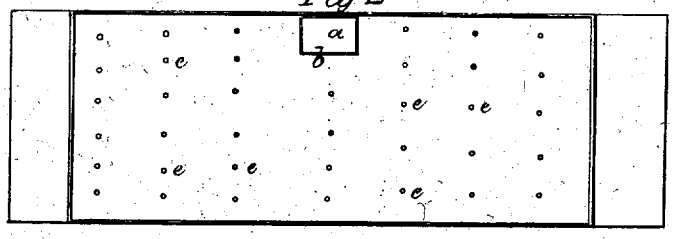

In order to increase the quantity of incoming or pure air, I place a cap or caps, *j*, a transverse section of which I have shown in Fig. 3, and a horizontal section in Fig. 4, over the pure-air shafts, which is equivalent to the lips I have before referred to. In both the front and back of this cap I provide openings *m m m′ m′* for the admission of air, and furnish each opening with a swinging valve or shutter, *n*, opening inward. The shutters of the openings *m m* will be opened and those of *m′ m′* closed by the pressure of the air consequent upon the movement of the car while running in one direction, and those of the openings *m′ m′* opened and of *m m* closed by the same means while running in the opposite direction. In order to facilitate the egress of the vitiated air, I also place a cap, *o*, over the foul-air shafts *a a*, and provide openings in the cap furnished with valves or shutters operating on a similar principle, but in a manner precisely the reverse of the valves or shutters *n n*.

I will now proceed to point out briefly the application of my system of ventilation to steamboats, ships, and other vessels. In building a new steamer or other vessel the space between the lining and the vessel's plank might with great ease be converted into an escape-passage for the foul air. In applying the system to an old one the foul air might be made to pass under the seats by which the cabins are commonly surrounded, and taken out at proper intervals by wooden pipes or chimneys. The floor, however, ought if possible to be perforated in order that the body of foul air and carbonic acid gas which is there constantly generating, and at every opportunity coming up through the cracks and crevices, might be constantly drawn off. This space is worse if possible than in a dwelling-house. In the case of a steamer the expense of fuel and room occupied by an air warmer or ventilator may be saved by bringing the external air (properly confined, of course) over some part of the boiler or some of the steam-pipes into the cabin or hold through an aperture which could be closed or opened and the temperature thereby regulated at pleasure. The pure air would be best precipitated downward through the deck by a wind-sail. If, however, an air-warmer be required, the fresh air must be brought under it and the casing constructed similar to those in the buildings and railroad-cars.

Having thus fully described the principles of and practical application of my invention, I will proceed to point out what I claim and desire to secure by Letters Patent.

1. The mode herein described of warming and ventilating buildings, railroad-cars, and apartments of every known description, the same consisting in introducing the air from without by conducting it under the floor of the building or apartment and directly under the air warmer or ventilator for the purpose of being warmed for distribution, the air after being thus warmed rising in a central or otherwise convenient apartment or passage, and thence being admitted into the various rooms of the building or into the apartment, near the ceiling or roof, without the aid of pipes, and thence passing downward and through openings in the lower part of the rooms or apartment, and thence outward through the various channels provided connected with the foul-air shaft. I do not claim simply introducing warm air at the top of a room and discharging it at the bottom, but only intend to claim this when effected in the manner substantially as above described.

2. The arrangement of the radiating pipes or flues of the air-warmer in combination with the fire-chamber situated within or between them, in the manner substantially as set forth.

3. In combination with the elevated air chamber and flues of the air warmer, the arrangement of the openings for admitting heated air above the fire to complete the combustion, as herein set forth.

4. The construction of the fire-grate as herein set forth—viz., with one or more grates of cylindrical or other form raised above the ordinary grate-floor, said raised grates being capped or covered in such manner as to protect the vertical bars from the fuel substantially as herein set forth, and the principle of their action being substantially as herein set forth.

5. The mode of conducting the air into the pure-air shafts whatever may be the direction of the wind or of the external currents of air by placing a swinging valve or shutter at the mouth of said shafts, substantially in the manner herein set forth.

6. So constructing or placing the mouths of the pure-air shafts for the ventilation of railroad-cars that by the motion of the car the incoming pure air may be increased in quantity, as herein fully set forth.

H. RUTTAN.

Witnesses:
HENRY T. BROWN,
R. W. FENWICK.